US007647492B2

(12) United States Patent
Asnis et al.

(10) Patent No.: US 7,647,492 B2
(45) Date of Patent: Jan. 12, 2010

(54) ARCHITECTURE FOR ROUTING AND IPSEC INTEGRATION

(75) Inventors: James D. Asnis, Santa Cruz, CA (US); Teemu S. Lehtonen, Espoo (FI); Olev Kartau, Kauniainen (FI)

(73) Assignee: Check Point Software Technologies Inc., Redwood City, CA (US)

( * ) Notice: Subject to any disclaimer, the term of this patent is extended or adjusted under 35 U.S.C. 154(b) by 897 days.

(21) Appl. No.: 10/941,772

(22) Filed: Sep. 15, 2004

(65) Prior Publication Data

US 2006/0059370 A1    Mar. 16, 2006

(51) Int. Cl.
*H04L 29/06*    (2006.01)
(52) U.S. Cl. .................. 713/151; 713/153; 713/189; 726/13; 709/224; 709/225; 709/233; 709/234
(58) Field of Classification Search ............ 713/153, 713/160, 189, 151; 726/4, 13; 380/30, 285; 370/389, 392; 709/224–225, 229, 233–234
See application file for complete search history.

(56) References Cited

U.S. PATENT DOCUMENTS

| 5,416,842 | A | * | 5/1995 | Aziz | ............... 380/30 |
| 6,101,543 | A | * | 8/2000 | Alden et al. | ............... 709/229 |
| 6,226,748 | B1 | | 5/2001 | Bots et al. | |
| 6,240,514 | B1 | * | 5/2001 | Inoue et al. | ............... 713/153 |
| 6,839,346 | B1 | * | 1/2005 | Kametani | ............... 370/389 |
| 7,042,842 | B2 | * | 5/2006 | Paul et al. | ............... 370/229 |
| 2004/0101138 | A1 | * | 5/2004 | Revital et al. | ............... 380/210 |
| 2005/0125692 | A1 | * | 6/2005 | Cox et al. | ............... 713/201 |

FOREIGN PATENT DOCUMENTS

| EP | 1443731 A2 | 8/2004 |
| WO | WO 01/82097 A1 | 11/2001 |
| WO | WO 01/91403 A2 | 11/2001 |

* cited by examiner

*Primary Examiner*—Thanhnga B Truong
(74) *Attorney, Agent, or Firm*—Squire, Sanders & Dempsey L.L.P.

(57) ABSTRACT

The invention is directed towards routing a packet using both IPSec and common routing protocols within dynamic network topologies in a VPN. The routing of IPSec packets employs Open System Interconnection (OSI) layer three information. In one embodiment, a tree mechanism is used for looking up layer three information that may be associated with a protected subnetwork. When a packet is identified as being associated with a protected subnetwork, the packet may be encrypted and encapsulated, including the original destination and source IP address header information within another packet employing the IP Encapsulating Security Payload (ESP) protocol. New source and destination IP addresses are provided for the new packet using IP addresses associated with an entry gateway and an exit gateway to the VPN. The new packet may then be routed through the VPN using traditional routing protocols.

9 Claims, 7 Drawing Sheets

ARCHITECTURE FOR ROUTING AND IPSEC INTEGRATION

FIELD OF THE INVENTION

The invention relates generally to Internet Protocol networking and topology, and more particularly but not exclusively to routing and IPSec integration for dynamic network topology in a virtual private network.

BACKGROUND OF THE INVENTION

A virtual private network (VPN) enables secure communication over an external/untrusted IP network such as the Internet. A VPN provides a relatively secure way to connect nodes on internal trusted networks that are remote from each other, such as clients, servers, and host computers. Encryption and other security mechanisms are typically employed to create secure point to point "tunnels" for plain text messages/packets between authorized users over an untrusted external network. Typically, "plain text" packets are encrypted and inserted into an outer packet. The inner "plain text" packet is subsequently "tunneled" (forwarded) over the untrusted external IP network from one VPN gateway to another VPN gateway where the outer packet is decrypted and the inner "plain text" packet is forwarded towards its destination on the internal network. The other packet serves as a protective shell or encapsulation for the "plain text" packet as it is tunneled from one node to another node over the external untrusted network.

Typically, a gateway in a VPN also operates as a router for IP traffic on their internal networks. For example, upon receiving a "plain text" packet from a node on a trusted internal network, the VPN gateway looks up the destination in a selector list to see whether or not the packet was directed to a destination outside the locally attached internal network and if it should be encrypted for tunneling to the destination. If true, the VPN gateway securely tunnels the "plain text" packet to a particular VPN gateway peer associated with the destination over an external untrusted network. The particular VPN gateway peer determines if the destination of this tunneled packet is on their own selector list. And if so, decrypts the encrypted packet and forwards it to a node on its locally attached internal network. Additionally, if the destination of the "plain text" packet had not been on the selector list but had been an entry in a routing table, the VPN gateway would have forwarded the unencrypted plain text packet to the destination.

As more and more gateways are added to a VPN, a mesh topology may be developed where all of the gateways were aware of every other gateway in the VPN. Also, tunnels may be established between each gateway in the VPN. However, since each tunnel can be associated with a selector in a list kept at each gateway, an administrator may have to update this list at each gateway whenever a new gateway was added to the VPN, or a route was dynamically changed. Thus, as the number of gateways in a VPN grows, the effort required to update each list of selectors on each gateway can become burdensome. Moreover, encryption services employed on the VPN gateway may be unaware of dynamic routing changes.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Briefly stated, the invention is directed towards a system, method, and apparatus for routing a packet using IPSec and common routing protocols within dynamic network topologies in a VPN. The invention describes a mechanism for securely tunneling packets by employing Open System Interconnection (OSI) layer three information, such as source and destination addresses. In one embodiment, a tree mechanism is used for looking up IP addresses that may be associated with a protected subnetwork. When a packet is identified as being associated with a protected subnetwork, the packet is encrypted and encapsulated within another packet employing such protocols as IP Encapsulating Security Payload (ESP), and the like. The entire packet may be encrypted and encapsulated, including the original destination and source IP address header information. New source and destination IP addresses are provided for the other packet using IP addresses associated with an entry gateway and an exit gateway to an IPSec tunnel. As the new packet reaches its destination, it may be decrypted, unencapsulated, and routed using the original IP address header information.

Illustrative Environment

Figure 1:
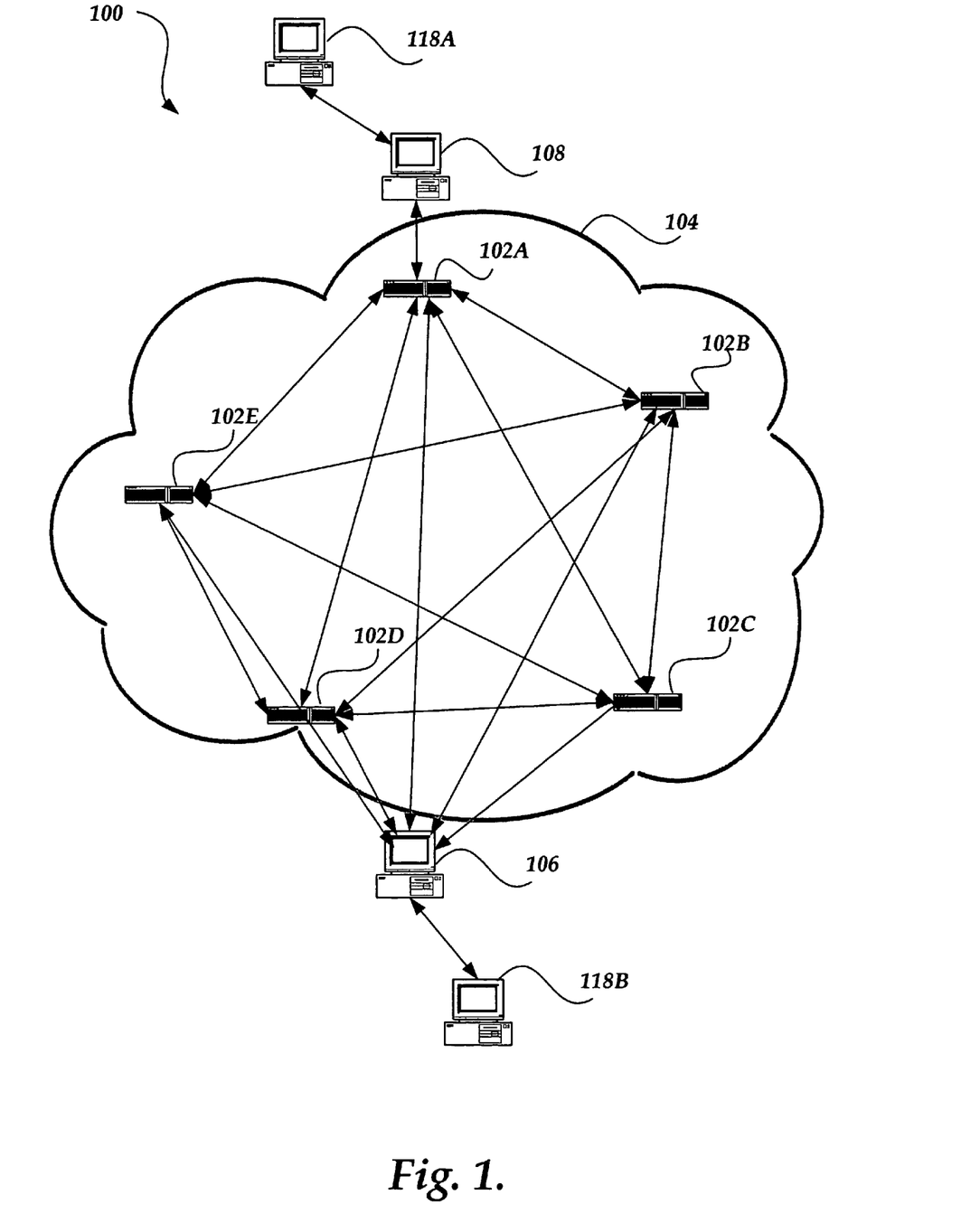
FIG. 1 shows a functional block diagram illustrating one embodiment of an environment for practicing the invention.

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other wellknown environments and configurations may be employed without departing from the scope or spirit of the present invention.

As shown in the figure, operating environment 100 includes gateways 102A-102E that are connected to each other through tunnels over network 104. External gateways 106 and 108 are in communication with network 104 though various gateways 102A-104A. Client 118A is in communication with external gateway 108, and client 118B is in communication with external gateway 106.

Generally, gateways 102A-102E and external gateways 106 and 108 may include virtually any computing device capable of connecting to another computing device to send and receive information over a network, including routers, firewalls, and the like. Thus, while these devices are called gateways, they may actually be implemented as a router, or similar network device. One embodiment of gateways 102A-102E is described in more detail below in conjunction with FIG. 2.

The types of devices for clients 118A and 118B may also include virtually any computing device capable of communicating over a network using a wired or wireless communications medium such as personal computers, multiprocessor systems, microprocessor-based or programmable consumer electronics, network PCs, and the like.

Network 104 is configured to employ any form of computer readable media for communicating information from one electronic device to another that is capable of layers 3 and 4 communication under the OSI model. Also, a network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media capable of Layer 3 and layer 4 communication under the OSI model such as, but not limited to, twisted pair, coaxial cable, fiber optics, wave guides, and other wired media and wireless media such as, but not limited to, acoustic, RF, infrared, and other wireless media.

Illustrative Gateway Environment

Figure 2:
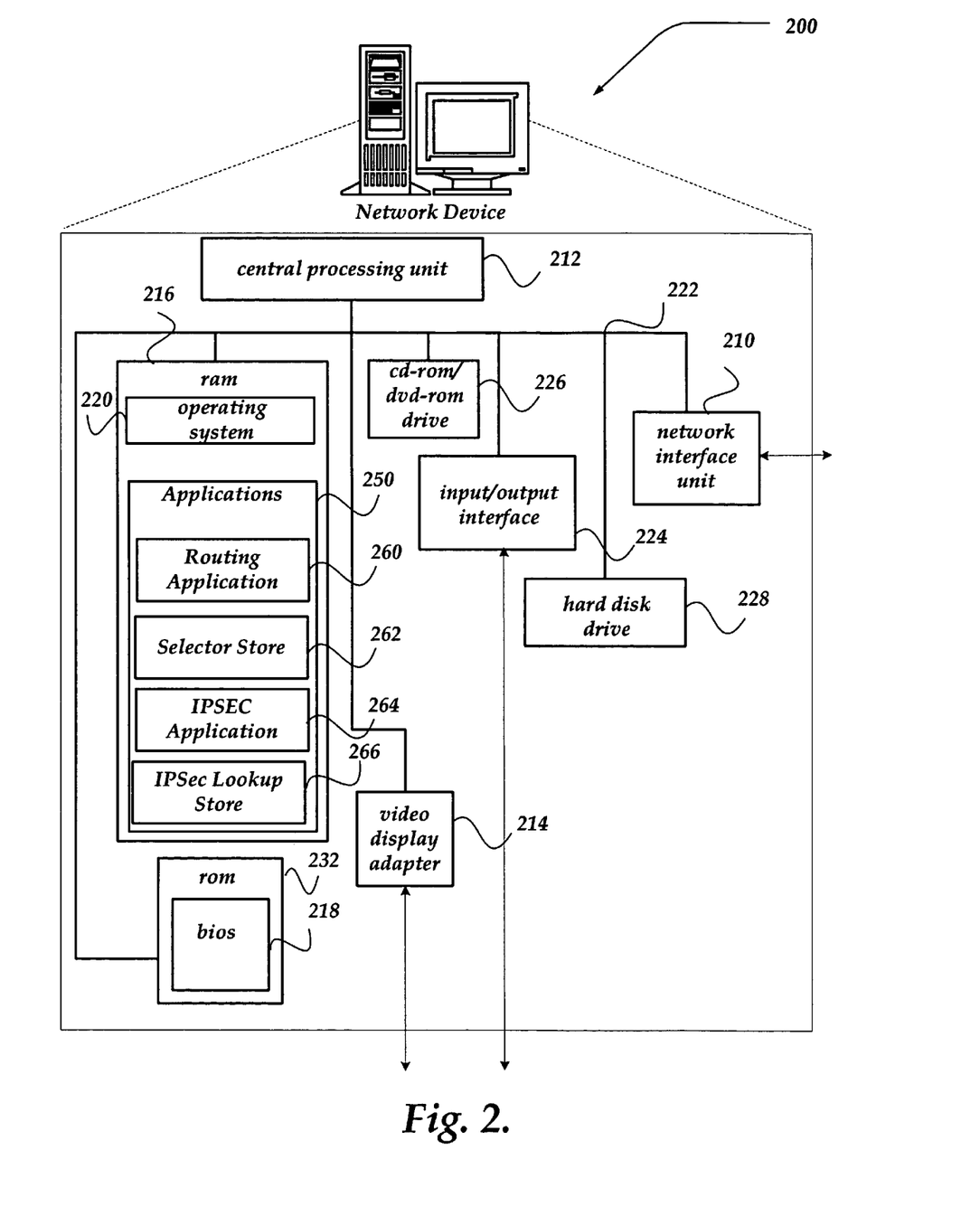
FIG. 2 illustrates one embodiment of a network device that may be included in a system implementing the invention.

FIG. 2 shows one embodiment of a network device for enabling the operation of a gateway, such as gateways 102A-102E of FIG. 1, according to one embodiment of the invention. Network device 200 may include many more components than those shown. The components shown, however, are sufficient to disclose an illustrative embodiment for practicing the invention.

Network device 400 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including, but not limited to the RIP, OSPF, SNMP, HTTP, UDP/IP, TCP/IP protocols, and the like. For example, in one embodiment, network interface unit 210 may employ a hybrid communication scheme using both TCP and IP multicast. Network interface unit 210 is sometimes known as a transceiver, network interface card (NIC).

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

One or more applications 250 may be loaded into mass memory and run on operating system 220. Examples of application programs may include transcoders, schedulers, graphics programs, database programs, word processing programs, HTTP programs, user interface programs, various security programs, and so forth. Mass storage may further include applications such as routing application 260, selector store 262, IPsec application 264, and IPSec Lookup Store 266. These applications may also interact with other components residing on the network device, another network device, gateway, and the like.

Although illustrated in FIG. 2 as distinct components, routing application 260, selector store 262, IPsec application 264, and IPSec Lookup Store 266 may be arranged, combined, and the like, in any of a variety of ways, without departing from the scope of the invention. For example, components of IPsec application 264 and IPSec Lookup Store 266 may be integrated as a single application, or several applications. Moreover, components of IPSec application 264, IPSec Lookup Store 266 and the like, may reside in one or more computing devices similar to network device 200.

Figure 3:
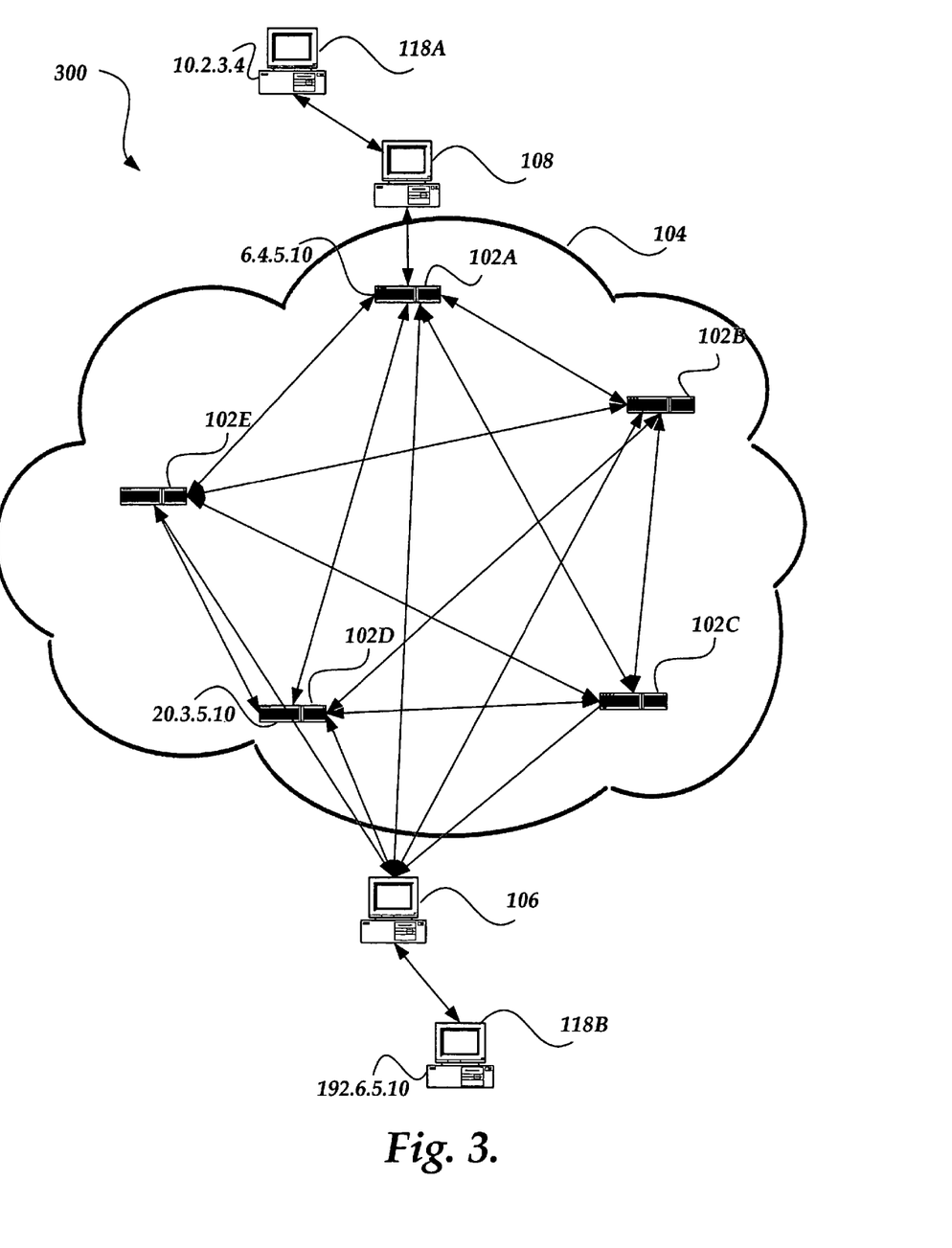
FIG. 3 shows the functional block diagram of FIG. 1 with one embodiment of addresses associated with different network devices.

FIG. 3 illustrates the functional block diagram of FIG. 1 with one embodiment of addresses associated with different network devices. System 300 of FIG. 3 is substantially similar to system 100 of FIG. 1. Thus, similarly labeled components operate substantially similar. FIG. 3, however, illustrates IP addresses associated with various components. For example, as shown in the figure, an IP address of 192.6.5.10 is associated with client 118B. IP address 10.2.3.4 is associated with client 118A. Similarly, IP address 20.3.5.10 associated with gateway 102D, while IP address 6.4.5.10 is associated with gateway 102A. Clearly, such IP addresses are intended as examples only, and therefore, virtually any IP address may be associated with the components. The IP addresses may now be used to illustrate how the invention operates in one embodiment.

Figure 4:
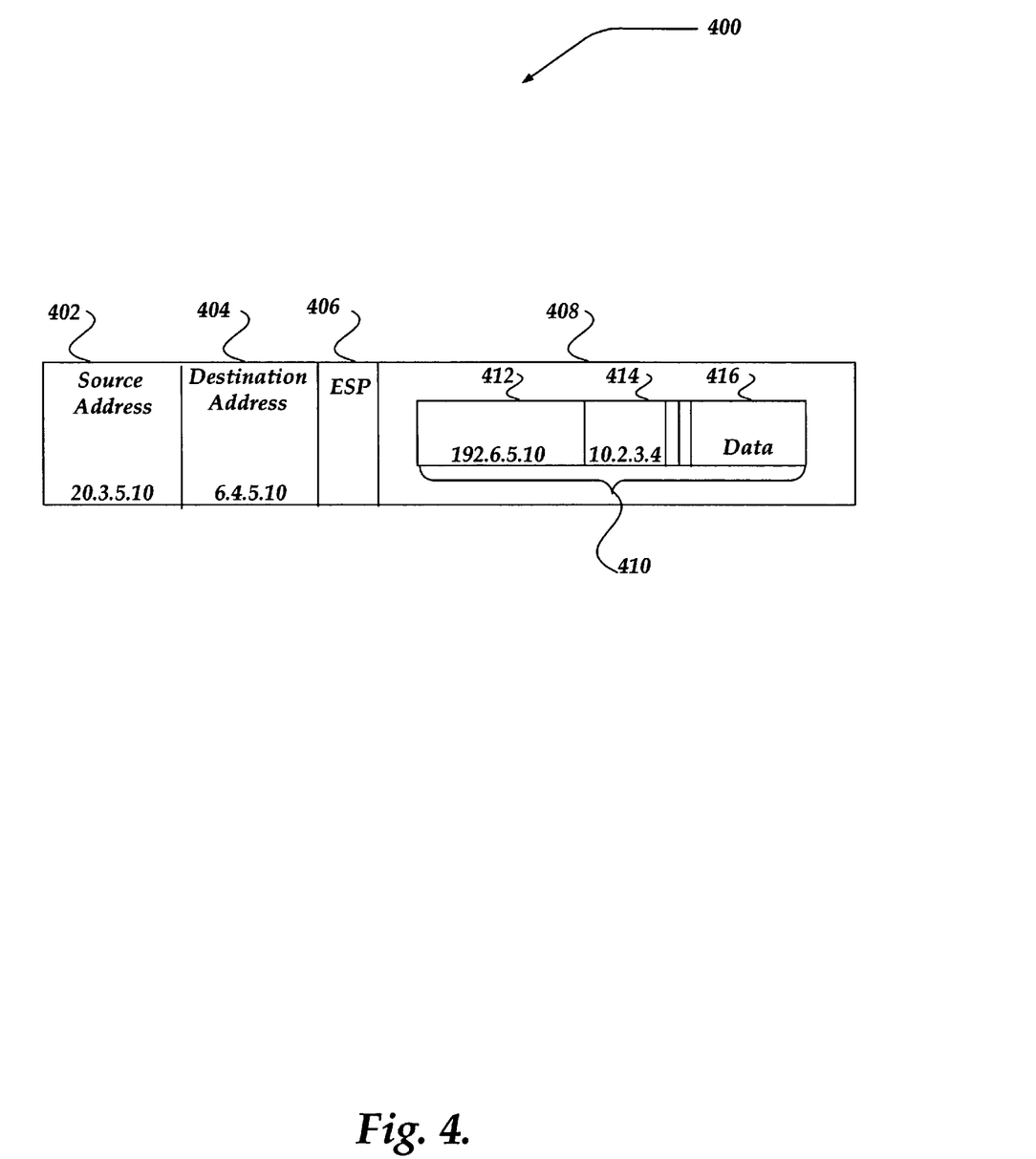
FIG. 4 illustrates one embodiment of an enhanced network packet.

FIG. 4 illustrates one embodiment of an enhanced network packet, in accordance with the invention. Enhanced network packet 400 may include many more components than those shown. The components shown, however, are sufficient to disclose an illustrative embodiment for practicing the invention.

As shown in the figure, enhanced network packet 400 includes source address header 402, destination address header 404, Encapsulating Security Payload (ESP) header 406, and data field 408. Data field 408 includes network packet 410, which includes, among other components not shown, original IP source header 412, original IP destination header 414, and original data 416.

Enhanced network packet 400 may be implemented employing the IP ESP protocol described in the Internet Request for Comments (RFC 2406), which is hereby incorporated by reference. For example, in the illustrated embodiment, the transport-mode protocol so described in RFC 2406 may be employed so that only the contents of data field 408 is encrypted and encapsulated. However, the invention is not so limited. For example, enhanced network packet 400 may be implemented using the tunnel-mode protocol mechanism of RFC 2406, or the like.

In the figure, it has been assumed, for illustrative purposes only, that the original IP source address for network packet 410 is IP address 192.6.5.10, while the original IP destination address for network packet 410 is IP address 10.2.3.4. Thus, referring to FIG. 3, the original network packet 410 was sent from client 118B and is destined for client 118A.

As further illustrated, network packet 410 is encrypted and encapsulated within enhanced network packet 400. Enhanced network packet 400 has assigned a source IP address of 20.3.5.10, which is associated with gateway 102D of FIG. 3. Enhanced network packet 400 also has assigned a destination IP address of 6.4.5.10, which is associated with gateway 102A of FIG. 3.

Illustrative Flowcharts

Figure 5A:
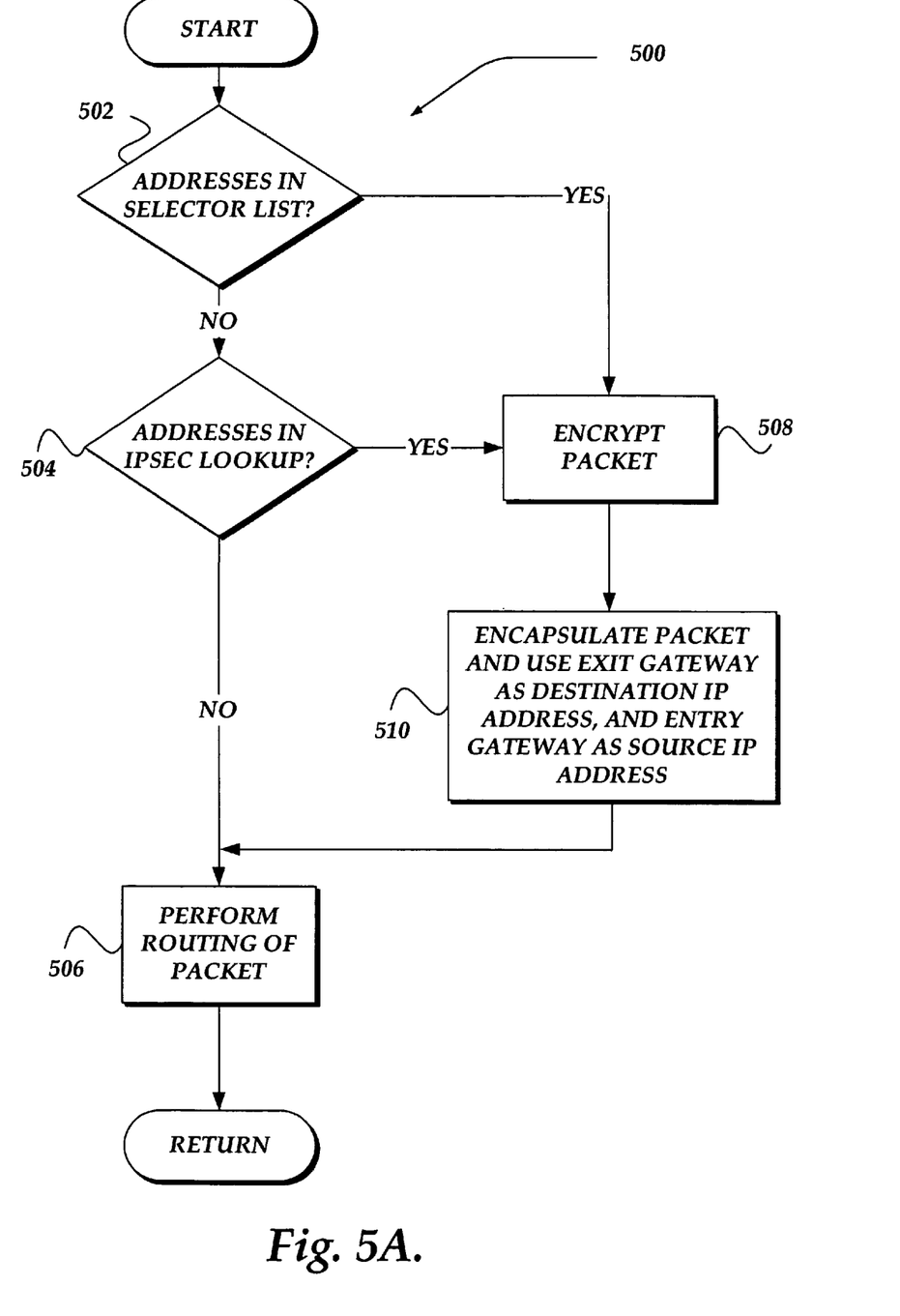
FIG. 5A shows a logical flow diagram generally showing one embodiment of a process for sending a network packet.

The operation of certain aspects of the invention will now be described with respect to FIGS. 5A, 5B and 6. FIG. 5A illustrates a logical flow diagram generally showing one embodiment of a process for sending a network packet using IPSec in a VPN with a potentially dynamic network topology. Process 500 of FIG. 5A may be implemented within at least one of gateways 102A-102E of FIG. 1. Process 500 typically is entered when a network packet is received by a gateway at a boundary of a VPN.

Process 500 begins, after a start block, at decision block 502 where a determination is made as to whether the IP addresses in the received network packet are included within a selector list. If the IP addresses are not within the list, process 500 flows to decision block 504. However, if a match is found in the selector list for the IP addresses, then the process advances to block 508 where the network packet is encrypted using any of a variety of encryption algorithms.

At decision block 504, a determination is made whether the IP addresses, source and destination, are found in an IPSec dynamic routing lookup store, such as IPSec lookup store 266 of FIG. 2. In one embodiment, the IPSec lookup store employs a Patricia tree mechanism, and in another embodiment other types of trees or data structures may be employed. However, the invention is not so limited, and virtually any searching and storage mechanism may be employed. In any event, if a match is identified within the IPSec dynamic routing lookup store, processing branches to block 508; otherwise, processing continues to block 506, where common network protocol routing of the packet is performed. Upon completion of block 506, process 500 returns to a calling process to perform other actions.

If, however, processing branches to block 508 from decision block 504 or decision block 502, then the received data packet is encrypted using any of a variety of encryption algorithms. Processing next moves to block 510, where the encrypted packet is encapsulated within another (enhanced) network packet that is configured using ESP protocol, or the like. Additionally, the enhanced network packet uses an IP address associated with the receiving gateway as a source IP address. The enhanced network packet further uses an IP address associated with an exit gateway on the VPN as the destination IP address. Processing then proceeds to block 506, where the enhanced network packet is routed using any of a variety of common packet routing protocols. Upon completion of block 506, process 500 returns to a calling process to perform other actions.

Figure 5B:
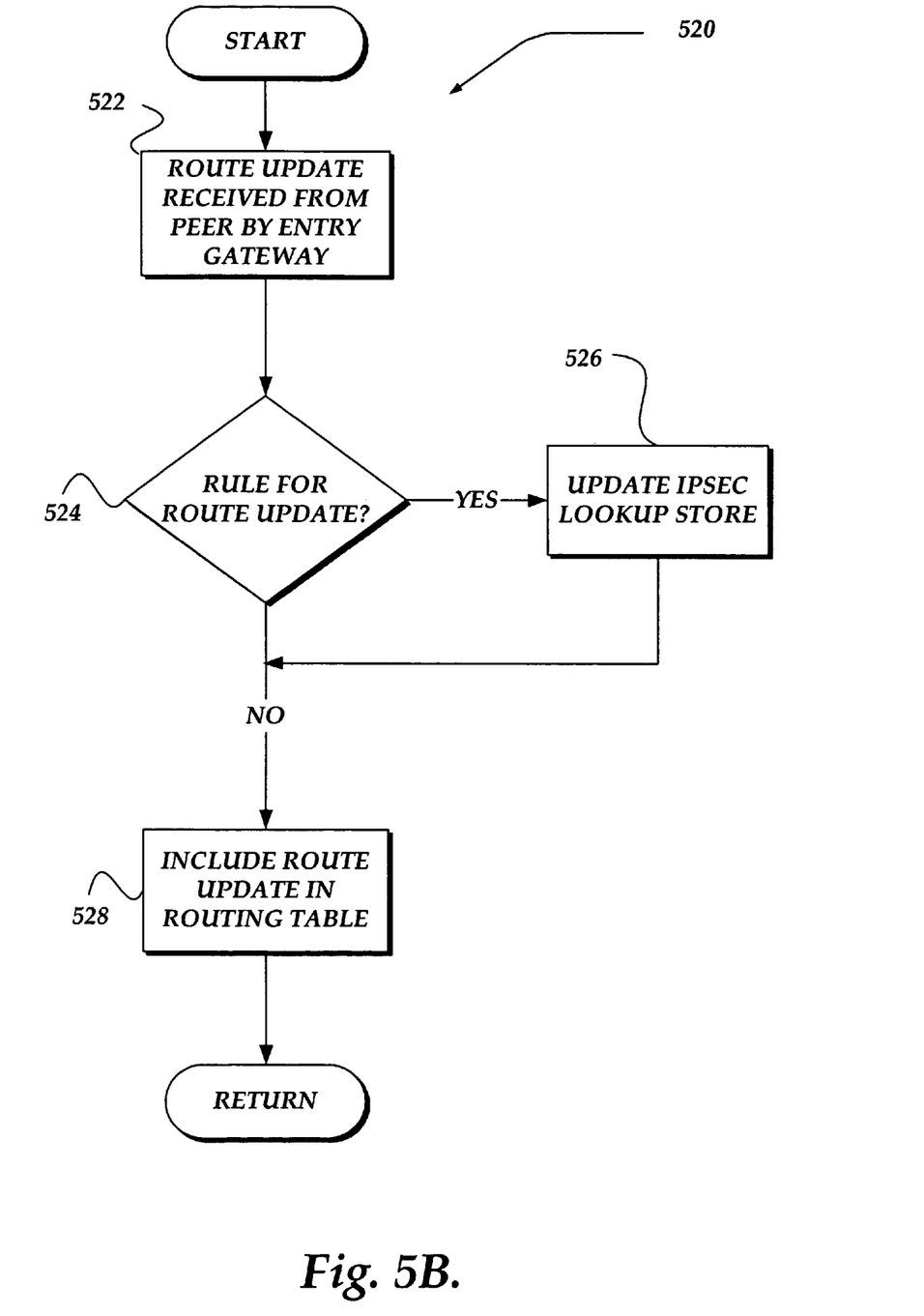
FIG. 5B illustrates a logic flow diagram generally showing another embodiment of a process for sending a network packet.

FIG. 5B illustrates a logical flow diagram generally showing one embodiment of a process for updating a route in a VPN with a potentially dynamic network topology. Process 520 of FIG. 5B may be implemented within at least one of gateways 102A-102E of FIG. 1. Process 520 typically is entered when a network packet is received by a gateway at a boundary of a VPN.

Process 520 begins, after a start block, at block 520 where a routing daemon at an entry gateway receives a route update from a peer. The peer can include an OSPF peer, Metahop peer, or any other type of peer that is protected by the VPN. Next, the process steps to decision block 524 where the routing daemon optionally compares the route update to a rule list. If there is an affirmative comparison, the process steps to block 526 where an IPSEC lookup store is updated by the routing daemon at the entry gateway. The process then returns to a calling process for performing other operations.

However, if the determination at decision block 524 was negative (no positive rule comparison for route update), then the process would advance to block 528 where the routing update would be included in a routing table by the routing daemon. In this case, the routing update would not be included in the IPSEC lookup store. Next, the process would return to a calling process for performing other operations.

Figure 6:
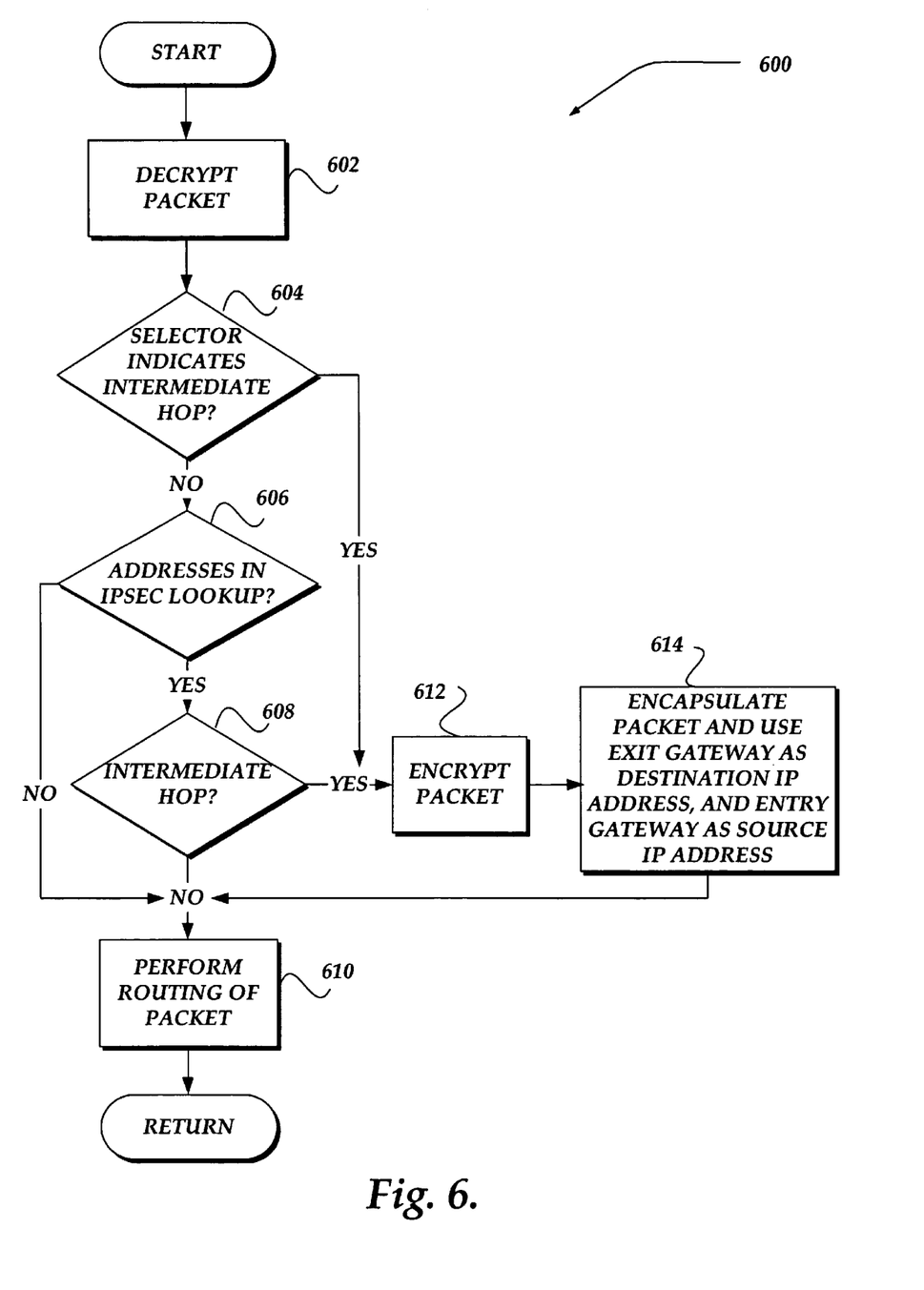
FIG. 6 shows a logical flow diagram generally showing still another embodiment of a process for receiving a network packet, in accordance with the present invention.

FIG. 6 illustrates a logical flow diagram generally showing one embodiment of a process for receiving a network packet using IPSec in a VPN with a potentially dynamic network topology. Process 600 of FIG. 6 may be implemented within at least one of gateways 102A-102E of FIG. 1. Process 600 is typically entered when another gateway within the VPN receives the enhanced network packet from process 500 of FIG. 5.

Process 600 begins, after a start block, at block 602, where the received network packet may be decrypted. Processing then proceeds to decision block 604, where a determination is made as to whether a selector list indicates that the received network packet includes an intermediate network hop. If so, processing proceeds to block 612; otherwise, processing proceeds to decision block 606.

At decision block 606, a determination is made whether the IP addresses within the network packet match IP addresses within an IPSec lookup store, such as IPSec lookup store 266 of FIG. 2. In one embodiment, the IPSec lookup store employs a Patricia tree mechanism. However, the invention is not so limited, and virtually any searching and storage mechanism may be employed. In any event, if a match is found, processing continues to decision block 608; otherwise processing branches to block 610.

At decision block 608, a determination is made as to whether the routing of the network packet involves an intermediate hop. If so, processing proceeds to block 612, otherwise, processing proceeds to block 610.

At block 612, the received network packet is re-encrypted. Processing then continues to block 614, where the re-encrypted packet is re-encapsulated. This re-encapsulated (enhanced) network packet is created using the IP address of the VPN's entry gateway as the IP source address and the IP address of the VPN's exit gateway as the IP destination address. Processing then continues to block 610.

At block 610, the received network packet is routed employing any common packet routing protocols. In the instance where the network packet was decrypted, making the original encapsulated data packet available for routing, the original IP destination address is employed to route the network packet to its destination. Upon completion of block 610, processing returns to a calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. An apparatus, comprising:
   a memory configured to store instructions; and
   a processor configured to enable actions based at least in part on the instructions, including
   decrypting an encrypted packet that is included in an encapsulated packet, wherein the encapsulated packet is received over a network;
   if a selector list indicates an intermediate hop for the decrypted packet, re-encrypting and including the decrypted packet in another encapsulated packet, wherein the other encapsulated packet is routed towards an exit gateway;
   if the decrypted packet is unassociated with an intermediate hop, routing the decrypted packet towards its destination;
   if a received routing update is associated with at least one rule, updating an internet protocol security lookup store with the routing update; and
   if the received routing update is unassociated with at least one rule, updating a routing table.

2. The apparatus of claim 1, wherein the actions of the processor further comprise:
   determining if a destination address in the decrypted packet is included in an internet protocol security lookup store;
   determining if an intermediate hop is indicated for the destination address included in an internet protocol security lookup store;
   re-encrypting the decrypted packet that includes the destination address that is indicated for the intermediate hop; and
   re-encapsulating the re-encrypted packet in another encapsulated packet, wherein the other encapsulated packet is forwarded towards the exit gateway.

3. The apparatus of claim 1, wherein the other encapsulated packet employs a destination internet protocol address of an exit gateway and a source internet protocol address of an entry gateway.

4. The apparatus of claim 1, wherein the actions of the processor further comprise:
   receiving a packet, wherein the packet is unencrypted;
   if a destination address and a source address of the received packet is included in the selector list, determining if the destination address and the source address are included in an internet protocol security lookup store;
   encrypting the packet that includes the source address and the destination address that are included in both the selector list and the internet protocol security lookup store; encapsulating the encrypted packet in the encapsulated packet; and
   forwarding the encapsulated packet towards its destination.

5. The apparatus of claim 4, wherein the encapsulated packet employs a destination internet protocol address of an exit gateway and a source internet protocol address of an entry gateway.

6. The apparatus of claim 1, wherein the encrypted packet included in the encapsulated packet includes a destination address and a source address that are separate from another destination address and another source address that are included in the encapsulated packet.

7. The apparatus of claim 1, wherein the other destination address is associated with an exit gateway and the other source address is associated with an entry gateway.

8. The apparatus of claim 1, wherein the apparatus includes at least one of a router, firewall, server, and a network device.

9. An apparatus, comprising:
   a memory configured to store a plurality of instructions; and a processor configured to employ the plurality of instructions to enable actions, including determining if a received packet encapsulates an encrypted packet, and if so, performing actions, comprising decrypting the encrypted packet that is included in the encapsulated packet;

if an intermediate hop is associated with the decrypted packet, re-encrypting the decrypted packet in another encapsulated packet, wherein the other encapsulated packet is routed towards an exit gateway;

if the decrypted packet is unassociated with an intermediate hop, routing the decrypted packet towards its destination;

if a received routing update is associated with at least one rule, updating an internet protocol security lookup store with the routing update; and if the received routing update is unassociated with at least one rule, updating a routing table.

* * * * *